Jan. 31, 1928.
W. G. WOLFE ET AL
1,657,776
METHOD OF AND APPARATUS FOR SEPARATING CERTAIN RAYS
Filed March 2, 1922
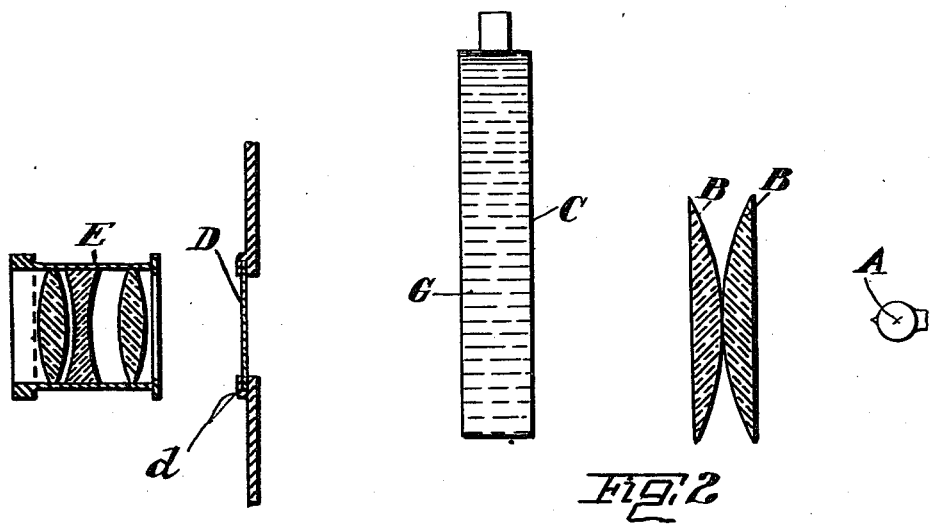
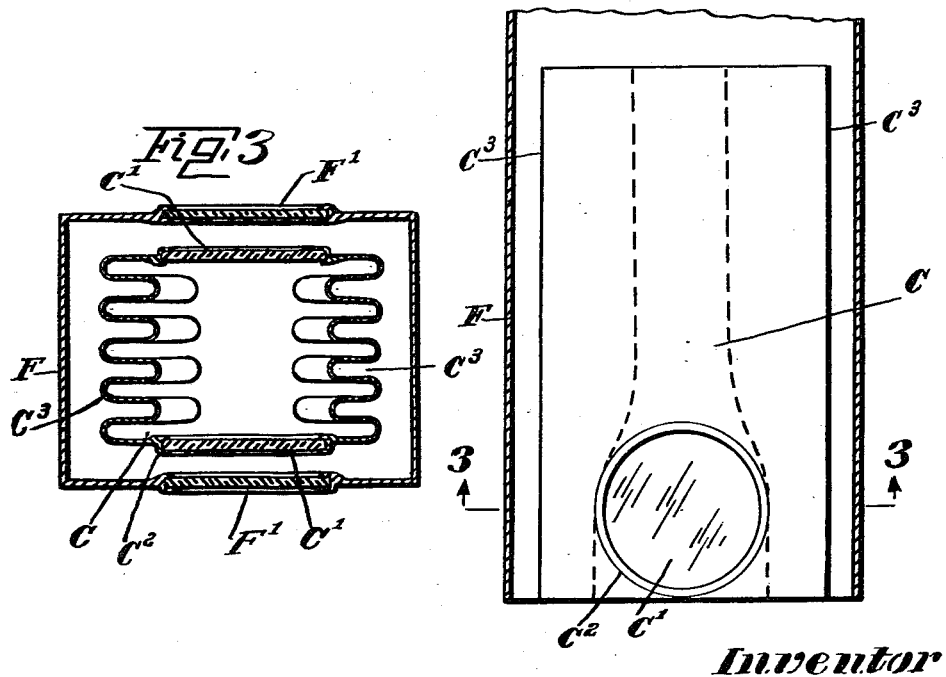
Inventor
Louis Bell
Walter G. Wolfe
By
Attorney Patented Jan. 31, 1928.

1,657,776

UNITED STATES PATENT OFFICE.

WALTER G. WOLFE, OF GREENWOOD, AND LOUIS BELL, OF WEST NEWTON, MASSACHUSETTS; SAID BELL ASSIGNOR TO WALTER G. WOLFE, TRUSTEE, OF GREENWOOD, MASSACHUSETTS.

METHOD OF AND APPARATUS FOR SEPARATING CERTAIN RAYS.

Application filed March 2, 1922. Serial No. 540,573.

It is well known that objects exposed in optical projection may be subject to injury from chemical or thermal action induced by the radiation received from the luminous source. Lantern slides may be cracked, films warped or even ignited and chemical or biological material irreparably damaged either from the direct thermal action or from the disintegrating effect of radiation of short wave length.

It is the specific purpose of our present invention to protect material projected by excluding from it certain radiations and particularly all radiation of low visibility so that the object shall be presented by rays of high luminosity balanced moreover chromatically so that the material will appear in its natural color as well as with maximum brilliancy. It is important to eliminate all rays of zero or small luminosity in order that there shall be a minimum amount of energy other than usefully luminous spent upon the material. We are well aware that water cells and cells of alum solution have been used in the path of the beam of a projecting apparatus under the impression that dangerous heating would be thereby prevented, but it is now well known that these materials are of very little service for the ordinary sources of radiation, although they obstructed a certain amount of heat from relatively low temperature sources.

In carrying out our invention we not only provide means for absorbing most of the so-called heat radiation from all ordinary sources but also obstruct all radiation of low luminosity of whatever wave length so as to relieve the material from the incidence of all energy which from direct thermal action or specific chemical action might injure it. To this end we provide in combination and in solution substances which absorb radiation of wave length too long to be of service visually and also substances capable of absorbing radiation of wave length too short to be of visual service whatever may be the amount of energy so radiated. With some modern illuminants the direct, thermal and chemical effect of radiation having wave lengths too short to be visible may be of serious moment and heretofore no effort has been made to screen the material in an optical lantern from such radiation, which may amount to a very material percentage of the total radiant energy of the source.

We have discovered that by combinations of certain absorptive materials as our media, it is possible at once to absorb from the total radiation substantially all that might thus prove injurious and at the same time to secure chromatic balance with other substances capable of absorbing substantially all the radiant energy of wave length too long to be of material luminosity. Such chromatic balance is necessary to the proper perception of the material projected in its natural or desired state.

We have moreover discovered groups of substances which not only meet the conditions herein set forth, but are also stable to light and a moderate degree of heating and have no chemical action upon each other which interferes with their co-action for the purpose herein set forth. We prefer to employ solutions of metallic salts having analogous constitution to lessen the danger of mutual reactions and employing these in such strength as to secure the necessary absorptive effects and in such proportion as to secure chromatic balance of the transmitted radiation of high luminosity. Such substances are the sulphates of iron, manganese, nickel, copper, cobalt, and didymium, the nitrates or chlorides of some or all of these combined in suitable strength and proportion. It is obvious that any liquid media which absorb substantially all the energy from the radiant source save that of high luminosity and which are not chemically changed thereby will be subject to somewhat severe heating, since a very large proportion of the energy from most light sources is in the form of non-luminous radiation.

In developing our invention it has been therefore not only necessary to discover substances which are not altered by moderate heat in their chemical nature, but to protect them against extreme rise of temperature in such manner as to prevent their boiling away or producing undue vapor pressure on the container. We therefore enclose our selective absorbing solution or solutions in a container or containers in part at least transparent but so disposed with respect to such transparent portion through which the beam of radiant energy passes as to permit free circulation of the solution out of the path of the beam and into portions of the container where by natural or artificial draft or other means of carrying away the heat such solution may be adequately cooled and returned in the course of its natural circulation to the area including the path of the beam. By the combination of such a circulatory function in the container and the solutions combined according to the principles hereinbefore set forth we are enabled to absorb without injurious heating of the solutions so large a proportion of the radiation of low or zero luminosity as not to injure the material used for projection even when it is as inflammable as ordinary celluloid films commonly used in roll film apparatus. Such films can be held indefinitely in focus without danger of ignition provided an absorbing cell constituted in accordance with our invention is placed in the path of the beam.

As illustrative of the principles of our invention, the methods involved and suitable media and apparatus, we will discuss the same in its application to a heat absorption screen and system for projectors such as those employed in moving pictures. In this industry there is immediate and very pressing need, both as a matter of convenience and safety, for some practical way of preventing ignition of the film by the intense heat of the source of illumination. Various devices have been attempted for protecting the film in case of its stoppage, but as far as we are aware these have not come into any general use and at best are but partially effective.

In accordance with our invention we propose permanently and continuously to screen the film from the greater part of the energy emanating from the source of illumination. Briefly we accomplish this by depriving the projecting beam of its non-luminous components before it reaches the film. For this purpose we preferably employ as above suggested a fluid filter which in accordance with our invention is kept suitably cool and which by its character and properties transmits a substantially uncolored beam from which nonluminous radiation is eliminated to such a degree that the balanced radiation of high luminosity remaining has in practice no effect on the film even in case of a considerable pause or interruption of its run.

As illustrative of our invention and as indicative of apparatus suitable for its practice, we have shown in the accompanying drawings a suitable form of device for use with moving picture apparatus. Throughout the specification and drawings like reference characters are employed to indicate corresponding parts, and in the drawings:

Fig. 1 is a diagrammatic view of related elements involved in our projection problem.

Fig. 2 is an elevation of a simple form of cell structure, and

Fig. 3 is a section of the same on the line 3—3, Fig. 2.

As projection apparatus varies widely in its specific construction, we have shown in Fig. 1 a mere diagram of a characteristic combination of such elements as would be present in the case of a moving picture projection apparatus. In such we have a source of radiant energy A with concentration lenses BB. Between the source of energy, i. e. the source of light A and the projection object, i. e. the film D, we interpose a cell C. At E we have indicated the focussing optical apparatus which specifically is not involved herein in any detail.

The source of radiant activity, i. e. the source of light, is in this problem usually an incandescent or arc ray. Any such source obviously generates a great amount of radiant energy which lies outside the range of wave lengths corresponding to what we commonly know as the visible spectrum. Furthermore, the actual range of wave lengths important for visual or illuminating purposes is, thermically considered, insignificant. Specifically we are concerned with the problem in practice of projecting only rays between about 700 $\mu\text{-}\mu$ and about 450 $\mu\text{-}\mu$. The remainder of the rays are either thermally or chemically extraneous and not only unnecessary but undesirable as they are essentially thermic or actinic as well and not illuminative.

In the cell C therefore we provide for the absorption of all radiant energy not optically useful for projection or at least so much as may be practically eliminated by combinations of media which we have been able to devise as of practical utility.

In our preferred apparatus we employ solutions of metallic salts. These are preferable by reason of certain combinative factors of our invention, but it will be understood that there are readily substitutive elements available for any given combination that we may set forth as illustrative of the principles of our invention.

Considering the source of radiant energy A and the condensers BB and the film guide D we may employ in our energy absorbing cell a strong aqueous solution of didymium nitrate combined with nickel nitrate solution in such quantity as balances the coloration of the didymium leaving the resulting solution substantially without distinguishing tint. The absorption of the didymium, nickel and water takes up the infrared energy actively while the nickel of itself extinguishes the ultra violet component of energy and modifies the violet and blue to the necessary extent to insure color balance.

Manganous, nickelic, didymium, nitrates or sulphates may be substituted. In case nitric salts be used, the corresponding nitrates may be employed and the balance or stability preserved by $HNO_3$.

In the above media the ferrous sulphate (or nitrate) absorbs the infra red rays and a part of the red. Cupric sulphates (or nitrate) is strongly supplementative and completes the elimination of the red rays in the visible spectra.

The sulphate or nitrate of the cobalt cuts off the violet and ultra violet but it also has the balancing function of the related media. In its action it so screens the beam in its combinative relation that the resultant rays combine again to form a comparatively balanced beam which projects the object (or otherwise) in a natural visualizable light. The balancing or neutralizing of the otherwise predominant color due to any of the strongly absorptive media used is thus effected by the use of another medium of different color combined in a proportion to bring the solution to a colorless or practically colorless condition is thus effected. For colored films and certain others photographed under controlling color conditions, the transmission of a chromatically unaffected beam is important. For other films it might not be important and in such cases the matter of absorption is the predominant characteristic.

The waves of energy emanating from A after being concentrated by BB pass the screen C before reaching the film at D. In passing the screen D it is possible as above set forth to eliminate (selectively) all rays such as red, infra red and the violet and ultra violet, leaving only those rays belonging to the bright or essentially visible part of the spectrum. There is therefore available a substantial visible beam of visible, illuminative rays from which the essentially thermal and chemic rays are eliminated.

Such a beam is so low thermally that the film of a moving picture apparatus may be stopped for a considerable period without danger of ignition or even damage.

In practice the cell C may be variously constructed. A cell C may be formed as a metal cell having a transparent window $C^1$ set in a frame $C^2$. The cell C in this instance may be laterally or otherwise corrugated as at $C^3$ to increase its radiating surface. This may be surrounded by a casing or flue F providing a natural draft about the cell C. The flue F is preferably provided with transparent portions $F^1$ aligned with the cell window $C^1$.

As will be seen by reference to Fig. 2, the cell corrugations $C^3$ may be carried in above the beam transmitting portion $C^1$ so as to increase the radiation surface and keep the body of the media G from becoming overheated.

In practice the cell C may be variously arranged and utilized. Its circulation may be internally a thermal circulation or may be thermally or otherwise externally radiated. It may furthermore be cooled in whole or in part by an air draft thermally or mechanically induced.

In fact there are a very wide range of mechanical arrangements and chemical combinations possible, all of which may be considered as within the broader tenets of our invention if falling within the limits of the appended claims.

What we therefore claim and desire to secure by Letters Patent is:

1. In a projection apparatus having a source of radiant energy, means for preserving the object to be projected against a part of said radiant energy, consisting in interposing between such source and object a body of fluid comprising a plurality of mutually non-reactive ray absorptive media, each medium being proportioned in its strength relative to its ray absorption to maintain chromatic balance.

2. The method of separating certain rays consisting in selectively absorbing them from a common beam by plural mutually non-reactive media absorptive for given wave lengths embodied in a common solution, and in proportioning the relative strength and character of individual media to give a substantially uncolored resultant filtered beam.

3. In combination with a projection apparatus having a source of radiant energy, a guide for a display to be projected and an interposed body of fluid media comprising a plurality of mutually non-reactive ray absorptive media, each medium being proportioned in its strength relative to its ray absorption to maintain chromatic balance.

4. A filter obstructing substantially non-luminous radiation comprising a plurality of mutually non-reactive ray absorptive media in common solution, each medium being proportioned in its strength relative to its ray absorption to maintain chromatic balance of the transmitted radiation.

5. A thermal filter comprising a cell, having a transparent portion disposed for the passage of a beam of light, and a radiation portion, and a ray absorbent fluid to said cell, and adapted to circulate to and from the transparent portion fluid media absorbent of nonluminous rays in said cell, an upward extension for said filler cell above the path of the beam to accommodate a supply of said medium, and a surrounding draft producing casing extending above said cell whereby the upwardly borne current of air may cool the filter cell and its extension.

6. A selective filter comprising a cell having extended portions, disposed for the passage of a beam of light, a media absorbent for non-luminous rays in said cell, and means for cooling said media, the extensions of said cell being surrounded by an upwardly extending draft producing casing whereby the upwardly borne current of air may cool the filter cell and its extension.

7. A thermal filter comprising a fluid mixture of mutually non-reactive but chromatically neutralizing salts, including one of thermic absorptiveness.

8. A thermal filter comprising a fluid mixture of mutually non-reactive but chromatically neutralizing media including one of thermic absorptiveness.

9. The method of separating non-luminous thermal waves from visible light waves consisting in screening out certain wave lengths by liquids thermally absorbent for rays of low visibility while at the same time neutralizing residual visible absorption by screening out rays of complementary color so as to transmit substantially colorless light.

10. The method of separating energy of low visibility from light waves consisting in screening off certain heat waves by a colored liquid thermally absorbent for such rays while at the same time neutralizing by complementary absorption the color of said liquid so as to transmit substantially uncolored light.

11. A thermal filter for a projection apparatus, comprising a unitary integral glass filter cell and radiating container of relatively narrow vertical cross section having non-light obstructing portions of its wall formed in alignment with the cell portion, said radiating portion extending upwardly from said portion to a relatively greater height than its width.

12. A thermal filter for a projection apparatus, comprising a unitary integral glass filter cell and radiating container of relatively narrow vertical cross section having non-light obstructing portions of its wall formed in alignment with the cell portion, said radiating portion extending upwardly from said cell portion to a relatively greater height than its width, and a surrounding draft flue enclosing said cell and radiating portions and provided with light passage areas opposite said aligned non-obstructing light passage portions.

13. A thermal filter for a projection apparatus, comprising a unitary integral glass filter cell and radiating container having non-light obstructing portions of its wall formed in alignment with the cell portion, said radiating portion extending upwardly from said cell portion.

14. A thermal filter for a projection apparatus, comprising a unitary integral glass filter cell and radiating container having non-light obstructing portions of its wall formed in alignment with the cell portion, said radiating portion extending upwardly from said cell portion, and a surrounding draft flue enclosing said cell and radiating portions and provided with light passage areas opposite said aligned non-obstructing light portions.

15. A selective filter comprising a light transmitting cell containing a fluid medium absorbent for non-luminous rays, said cell and medium extended upward from the portion directly in the path of the beam, and a surrounding draft flue enclosing said extension and provided with light passing areas opposite that portion of the filter cell traversed by the projected beam.

16. A thermal filter comprising a fluid mixture of mutually non-reactive but chromatically neutralizing media including one absorptive of the infra-red.

17. A thermal filter comprising a fluid mixture of mutually non-reactive media including a didymium element and a chromatically balancing element in substantial neutralizing relation to the same.

18. A thermal filter comprising a fluid mixture of mutually non-reactive but chromatically neutralizing media, including one absorptive of the red region of the spectrum and one absorptive in the violet region.

19. A thermal filter comprising a fluid mixture of mutually non-reactive media including a didymium element and a cobaltic chromatically balancing element in substantial neutralizing relation thereto.

20. The method of preserving the object to be viewed in an apparatus having a source of radiant energy, consisting in absorbing predetermined portions of said energy between the object and source by a fluid body including plural colored media, while maintaining a state of substantial chromatic balance during the absorption.

21. The method of preserving the object to be viewed in an apparatus having a source of radiant energy, consisting in absorbing different radiations from different portions of the spectrum by a fluid body including plural colored media, while maintaining substantial chromatic balance in the resultant emergent beam.

22. As a new composition of matter, a substantially uncolored fluid mixture of mutual chromatically neutralizing colored media having specific absorption for wave lengths of low visibility.

23. As a new composition of matter, a substantially uncolored fluid mixture of mutual chromatically neutralizing colored media, including a medium thermally absorptive for wave lengths of low visibility.

24. As a new composition of matter, a substantially uncolored fluid admixture of colored media in chromatic neutralizing relation including one of thermic absorptiveness.

25. As a new composition of matter, a substantially uncolored fluid admixture of colored media in chromatically neutralizing relation including one thermically absorptive for the invisible wave lengths.

26. A thermal filter for a high temperature source of light including a container and a substantially colorless fluid therein including a didymium compound in said solution and another heat absorbing compound also in solution therewith and of a neutralizing color for the didymium.

In testimony whereof we affix our signatures.

LOUIS BELL.
WALTER G. WOLFE.